United States Patent
Nirantar et al.

(10) Patent No.: US 10,178,199 B1
(45) Date of Patent: Jan. 8, 2019

(54) INTELLIGENT ALARM MANIPULATOR AND RESOURCE TRACKER

(71) Applicant: Seven Networks, LLC, Marshall, TX (US)

(72) Inventors: Abhay Nirantar, San Jose, CA (US); Ari Backholm, Los Altos, CA (US)

(73) Assignee: Seven Networks, LLC, Marshall, TX (US)

( * ) Notice: Subject to any disclaimer, the term of this patent is extended or adjusted under 35 U.S.C. 154(b) by 91 days.

(21) Appl. No.: 15/344,588

(22) Filed: Nov. 7, 2016

Related U.S. Application Data

(63) Continuation of application No. 14/223,689, filed on Mar. 24, 2014, now Pat. No. 9,516,127.

(60) Provisional application No. 61/805,070, filed on Mar. 25, 2013.

(51) Int. Cl.
*H04L 12/24* (2006.01)
*H04L 12/26* (2006.01)
*H04L 29/06* (2006.01)
*H04L 29/08* (2006.01)

(52) U.S. Cl.
CPC ........ *H04L 67/325* (2013.01); *H04L 41/0622* (2013.01); *H04L 41/0833* (2013.01); *H04L 43/0817* (2013.01); *H04L 67/2842* (2013.01); *H04L 67/30* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 5,954,820 | A | 9/1999 | Hetzler |
| 6,118,771 | A | 9/2000 | Tajika et al. |
| 7,062,567 | B2 | 6/2006 | Benitez et al. |
| 7,945,688 | B1 | 5/2011 | Lango et al. |
| 8,155,625 | B2 | 4/2012 | Morgan |

(Continued)

FOREIGN PATENT DOCUMENTS

| | | |
|---|---|---|
| CN | 103857019 A | 6/2014 |
| EP | 2343930 A2 | 7/2011 |

OTHER PUBLICATIONS

USPTO, Non-Final Rejection for U.S. Appl. No. 15/139,299, dated Nov. 15, 2016.

(Continued)

*Primary Examiner* — Tuan C Dao
*Assistant Examiner* — William C Wood
(74) *Attorney, Agent, or Firm* — NK Patent Law

(57) ABSTRACT

Systems and methods for tracking resources used by triggers such as alarms and timers that are used by mobile applications to schedule tasks and intelligently manipulating the timing of the triggers to optimize usage of resources such as, but not limited to: network, battery, CPU and/or memory are disclosed. In one embodiment, an intelligent alarm manipulator and resource tracker tracks triggers from multiple applications on a mobile device and corresponding use of resources resulting from the triggers on a mobile device. The intelligent alarm manipulator and resource tracker further determines correlations between the triggers and the corresponding use of the resources on the mobile device and manipulates, based on the correlations, timing or frequency of some or all of the triggers to optimize the use of the resources on the mobile device.

20 Claims, 13 Drawing Sheets

(56) References Cited

U.S. PATENT DOCUMENTS

| | | | |
|---|---|---|---|
| 8,280,456 B2* | 10/2012 | Hackborn | G06F 11/3409 |
| | | | 455/574 |
| 8,332,500 B1 | 12/2012 | Singleton et al. | |
| 8,340,633 B1 | 12/2012 | Rege et al. | |
| 8,655,307 B1 | 2/2014 | Walker et al. | |
| 8,838,086 B2 | 9/2014 | Giaretta et al. | |
| 8,886,176 B2 | 11/2014 | Luna et al. | |
| 8,943,204 B2 | 1/2015 | Caldeira de Andrada et al. | |
| 9,043,433 B2 | 5/2015 | Backholm et al. | |
| 9,122,735 B2 | 9/2015 | Locker et al. | |
| 9,264,868 B2 | 2/2016 | Giaretta et al. | |
| 9,474,022 B2 | 10/2016 | Lin et al. | |
| 2001/0036822 A1 | 11/2001 | Mead et al. | |
| 2002/0107042 A1 | 8/2002 | Murnaghan et al. | |
| 2003/0009571 A1 | 1/2003 | Bavadekar | |
| 2003/0046433 A1 | 3/2003 | Luzzatti et al. | |
| 2003/0055555 A1 | 3/2003 | Knockeart et al. | |
| 2004/0125800 A1 | 7/2004 | Zellner | |
| 2004/0192312 A1 | 9/2004 | Li et al. | |
| 2004/0264396 A1 | 12/2004 | Ginzburg et al. | |
| 2006/0149845 A1 | 7/2006 | Malin et al. | |
| 2006/0179147 A1 | 8/2006 | Tran et al. | |
| 2006/0195840 A1 | 8/2006 | Sundarrajan et al. | |
| 2006/0240805 A1 | 10/2006 | Backholm et al. | |
| 2006/0294388 A1 | 12/2006 | Abraham et al. | |
| 2007/0021065 A1 | 1/2007 | Sengupta et al. | |
| 2007/0073766 A1 | 3/2007 | Porter | |
| 2007/0171921 A1 | 7/2007 | Wookey et al. | |
| 2007/0192406 A1 | 8/2007 | Frietsch et al. | |
| 2007/0198634 A1 | 8/2007 | Knowles et al. | |
| 2007/0202850 A1 | 8/2007 | Pantalone et al. | |
| 2007/0238437 A1 | 10/2007 | Jaakkola | |
| 2007/0244987 A1 | 10/2007 | Pedersen et al. | |
| 2007/0260718 A1 | 11/2007 | Shenfield | |
| 2007/0286136 A1 | 12/2007 | Rittle et al. | |
| 2007/0286222 A1 | 12/2007 | Balasubramanian | |
| 2008/0008165 A1 | 1/2008 | Ikeda et al. | |
| 2008/0045253 A1 | 2/2008 | Mousseau et al. | |
| 2008/0057894 A1 | 3/2008 | Aleksic et al. | |
| 2008/0140794 A1 | 6/2008 | Rybak | |
| 2008/0148291 A1 | 6/2008 | Huang et al. | |
| 2008/0170852 A1 | 7/2008 | Santoro et al. | |
| 2008/0242370 A1 | 10/2008 | Lando et al. | |
| 2008/0305839 A1 | 12/2008 | Karaoguz et al. | |
| 2009/0049482 A1 | 2/2009 | Auerbach et al. | |
| 2009/0198766 A1 | 8/2009 | Chen et al. | |
| 2009/0232001 A1 | 9/2009 | Gong et al. | |
| 2009/0239574 A1 | 9/2009 | Hussain | |
| 2010/0077035 A1 | 3/2010 | Li et al. | |
| 2010/0083255 A1 | 4/2010 | Bane et al. | |
| 2010/0180082 A1 | 7/2010 | Sebastian et al. | |
| 2010/0217965 A1 | 8/2010 | Wolff | |
| 2010/0250701 A1 | 9/2010 | Harvell et al. | |
| 2010/0250986 A1 | 9/2010 | Black et al. | |
| 2010/0274507 A1 | 10/2010 | Black et al. | |
| 2010/0293286 A1 | 11/2010 | Nikkila et al. | |
| 2010/0312899 A1 | 12/2010 | Herzog et al. | |
| 2010/0317374 A1 | 12/2010 | Alpert et al. | |
| 2011/0040990 A1 | 2/2011 | Chan et al. | |
| 2011/0040996 A1 | 2/2011 | Hackborn et al. | |
| 2011/0046806 A1 | 2/2011 | Nagel et al. | |
| 2011/0047413 A1 | 2/2011 | McGill et al. | |
| 2011/0069089 A1 | 3/2011 | Kopf et al. | |
| 2011/0119478 A1 | 5/2011 | Jackson | |
| 2011/0131321 A1 | 6/2011 | Black et al. | |
| 2011/0177847 A1 | 7/2011 | Huang | |
| 2011/0185202 A1 | 7/2011 | Black et al. | |
| 2011/0194539 A1 | 8/2011 | Blasinski et al. | |
| 2011/0199905 A1 | 8/2011 | Pinheiro et al. | |
| 2011/0223974 A1 | 9/2011 | Agevik et al. | |
| 2012/0023190 A1 | 1/2012 | Backholm et al. | |
| 2012/0023236 A1* | 1/2012 | Backholm | H04L 47/20 |
| | | | 709/226 |
| 2012/0071141 A1 | 3/2012 | Nicoara et al. | |
| 2012/0135726 A1 | 5/2012 | Luna et al. | |
| 2012/0166865 A1 | 6/2012 | Liu et al. | |
| 2012/0173901 A1 | 7/2012 | Soliman et al. | |
| 2012/0185577 A1 | 7/2012 | Giaretta et al. | |
| 2012/0260118 A1* | 10/2012 | Jiang | G06F 9/4843 |
| | | | 713/340 |
| 2012/0272230 A1 | 10/2012 | Lee | |
| 2012/0278400 A1 | 11/2012 | Elson et al. | |
| 2012/0281561 A1 | 11/2012 | Shukla et al. | |
| 2012/0315960 A1* | 12/2012 | Kim | H04W 52/0254 |
| | | | 455/574 |
| 2012/0324110 A1 | 12/2012 | Kohli | |
| 2013/0010693 A1 | 1/2013 | Luna et al. | |
| 2013/0036428 A1 | 2/2013 | Lei et al. | |
| 2013/0070650 A1 | 3/2013 | McFarland et al. | |
| 2013/0078999 A1 | 3/2013 | Martin et al. | |
| 2013/0083713 A1 | 4/2013 | Johansson et al. | |
| 2013/0138987 A1 | 5/2013 | Wang | |
| 2013/0163431 A1 | 6/2013 | Backholm et al. | |
| 2013/0242781 A1 | 9/2013 | Hui et al. | |
| 2013/0268257 A1 | 10/2013 | Hu et al. | |
| 2013/0279384 A1 | 10/2013 | Wei | |
| 2013/0316716 A1 | 11/2013 | Tapia et al. | |
| 2013/0316769 A1 | 11/2013 | Kim | |
| 2013/0336179 A1 | 12/2013 | Rubin et al. | |
| 2013/0344859 A1 | 12/2013 | Abramson et al. | |
| 2014/0035722 A1 | 2/2014 | Kincaid et al. | |
| 2014/0038674 A1 | 2/2014 | Srinivasan et al. | |
| 2014/0064134 A1 | 3/2014 | Huang et al. | |
| 2014/0068303 A1 | 3/2014 | Hildebrand et al. | |
| 2014/0120961 A1 | 5/2014 | Buck | |
| 2014/0137122 A1 | 5/2014 | Egolf et al. | |
| 2014/0181560 A1 | 6/2014 | Muralidhar et al. | |
| 2014/0195839 A1* | 7/2014 | Chueh | G06F 1/329 |
| | | | 713/323 |
| 2014/0237067 A1 | 8/2014 | Todd | |
| 2014/0380283 A1 | 12/2014 | Hu et al. | |
| 2015/0095682 A1 | 4/2015 | Lim et al. | |
| 2015/0141043 A1 | 5/2015 | Abramson et al. | |
| 2015/0143151 A1 | 5/2015 | Yun et al. | |
| 2015/0168174 A1 | 6/2015 | Abramson et al. | |
| 2015/0212918 A1 | 7/2015 | Cai et al. | |
| 2015/0233985 A1 | 8/2015 | Chen et al. | |
| 2015/0312404 A1 | 10/2015 | Abramson et al. | |

OTHER PUBLICATIONS

USPTO, Final Office Action for U.S. Appl. No. 15/139,299 dated Mar. 3, 2017.
USPTO, Final Office Action for U.S. Appl. No. 13/844,787 dated Mar. 26, 2015.
USPTO, Non-Final Office Action for U.S. Appl. No. 13/115,740, dated May 29, 2015.
USPTO, Non-Final Office Action for U.S. Appl. No. 14/223,689, dated Jun. 24, 2015.
USPTO, Non-Final Office Action for U.S. Appl. No. 13/178,598, dated Jul. 17, 2015.
USPTO, Non-Final Office Action for U.S. Appl. No. 13/351,176, dated Jul. 21, 2015.
USPTO, Final Office Action for U.S. Appl. No. 14/223,689, dated Aug. 28, 2015.
USPTO, Non-Final Office Action for U.S. Appl. No. 13/815,908, dated Jul. 29, 2015.
USPTO, Final Office Action for U.S. Appl. No. 13/758,842 dated Aug. 20, 2015.
USPTO, Non-Final Office Action for U.S. Appl. No. 13/844,704, dated Aug. 21, 2015.
USPTO, Final Office Action for U.S. Appl. No. 14/474,248, dated Jul. 14, 2015.
USPTO, Non-Final Office Action for U.S. Appl. No. 13/844,787, dated Oct. 1, 2015.
USPTO, Non-Final Office Action for U.S. Appl. No. 13/844,682, dated Aug. 25, 2015.
USPTO, Final Office Action for U.S. Appl. No. 13/844,704, dated Mar. 20, 2015.
USPTO, Final Office Action for U.S. Appl. No. 13/115,740, dated Nov. 4, 2015.

(56) References Cited

OTHER PUBLICATIONS

USPTO, Final Office Action for U.S. Appl. No. 13/178,589, dated Jan. 4, 2016.
USPTO, Non-Final Office Action for U.S. Appl. No. 14/223,689, dated Jan. 26, 2016.
USPTO, Notice of Allowance for U.S. Appl. No. 14/602,808 dated Apr. 19, 2016.
USPTO, Non-Final Office Action for U.S. Appl. No. 14/602,808, dated Nov. 24, 2015.
USPTO, Final Office Action for U.S. Appl. No. 13/844,787, dated May 16, 2016.
USPTO, Non-Final Office Action for U.S. Appl. No. 13/115,740, dated Apr. 28, 2016.
USPTO, Notice of Allowance for U.S. Appl. No. 14/223,689, dated Nov. 15, 2016.
USPTO, Non-Final Office Action for U.S. Appl. No. 14/474,324, dated Jul. 6, 2016.
Search result of Jun. 16, 2016, performed by the Examiner on https://iq.ip.com/discover (InnovationQ—IP.com) and attached to the Non-Final Rejection of U.S. Appl. No. 14/474,324, dated Jul. 6, 2016.
USPTO, Notice of Allowance for U.S. Appl. No. 15/132,400, dated Jul. 14, 2016.
USPTO, Notice of Allowance for U.S. Appl. No. 14/467,838, dated Jul. 15, 2016.
Allen, Mitch, Palm® webOS™, Book, 2009, pp. 1-20, O'Reilly Media, Inc., Sebastopol, CA, USA.
USPTO, Notice of Allowance for U.S. Appl. No. 14/147,468, dated Nov. 30, 2016.
USPTO, Final Office Action for U.S. Appl. No. 14/691,373 dated Mar. 10, 2017.
USPTO, Non-Final Office Action for U.S. Appl. No. 14/546,053 dated Apr. 12, 2017.
Nov. 15, 2017 Seven v. *Google & Samsung Invalidity Cover Pleading EDTX*: Civil Action No. 2:17-cv-00442-JRG; Civil Action No. 2:17-cv-00441s-JRG.
Exhibit 127-B to Invalidity Contentions Civil Action No. 2:17-cv-00442-JRG; Civil Action No. 2:17-cv-00441s-JRG.
Exhibit C to Civil Action No. 2:17-cv-00442-JRG; Civil Action No. 2:17-cv-00441s-JRG.
Android 2.3 Platform Highlights, http://developer.android.com/sdk/android-2.3-highlights.html (Dec. 2010), available at https://web.archive.org/web/20101210235053/http://developer.android.com/sdk/android-2.3-highlights.html See e.g. "Improved power management".
Alshahawy, MR., Battery Power Saver application https://web.archive.org/web/20121230174903/http://store.ovi.com/content/162506.
Steve Litchfield, "Battery Power Saver—the ultimate battery helper?" (Jan. 26, 2013).
David Ruddock, "8 Great Apps Every Rooted Android User Should Know About," Jul. 13, 2010, available at https://web.archive.org/web/20100718234639/ http://www.androidpolice.com/2010/07/13/8-great-apps-every-rooted-android-usershould-know-about/ (archived Jul. 18, 2010).
Juice Defender application Latedroid, "JuiceDefender," Jan. 19, 2010, and comments posted on Feb. 14, 16, and 17, 2010, available at https://web.archive.org/web/20100221214647/ http://www.latedroid.com/2010/01/juicedefender.html (archived Feb. 21, 2010) and https://web.archive.org/web/20100405223340/ http://www.latedroid.com/2010/01/juicedefender.html (archived Apr. 5, 2010).
Latedroid, "JuiceDefender FAQ," Feb. 9, 2010, available at https://web.archive.org/web/20100223104054/ http://www.latedroid.com/2010/02/juicedefender-faq.html (archived Feb. 23, 2010).
Kevin Purdy, "JuiceDefender Saves Batteries by Automating Android Data," Mar. 1, 2010, available at https://web.archive.org/web/20100304152811/ http://lifehacker.com:80/5482663/juicedefender-saves-batteries-by-automatingandroid-data.
Microsoft, Set Thread Execution State Function, https://msdn.microsoft.com/en-us/library/windows/desktop/aa373208(v=vs.85).aspx, 2017.

"Configuración de Juice Defender y Ultimate Juiced," Jul. 1, 2010, available at https://web.archive.org/web/20100706051635/ http://android.scenebeta.com/tutorial/configuracion-de-juice-defender-y-ultimatejuiced (archived Jul. 6, 2010).
Android Kernel Features, https://elinux.org/Android_Kernel_Features (2012), available at https://web.archive.org/web/20121115132742/ https://elinux.org/Android_Kernel_Features, at p. 5.
Android OS for Servers, John Stultz, ELC 2011, at 16-24.
Invalidity contentions of U.S. Pat. No. 9,516,127 in view of U.S. Pat. No. 8,838,086.
https://android.googlesource.com/kernel/msm/+/android-msm-2.6.35/include/linux/android_alarm.h.
https://android.googlesource.com/kernel/msm/+/52630a39c5c9348381cec1b623def97f948f4df9/drivers/power/ds2784_battery.c.
Motlhabi, M. "Advanced Android power management and implementation of wakelocks." University of the Western Cape. Paper available online: http://www.cs.uwc.ac.za/~mmotlhabi/apm2.pdf (nd) (2008). See e.g., p. 3, 4.
Pathak, Abhinav, et al. "What is keeping my phone awake?: characterizing and detecting no-sleep energy bugs in smartphone apps." Proceedings of the 10th international conference on Mobile systems, applications, and services. ACM, 2012.
Zhang, et al., "Accurate online power estimation and automatic battery behavior based power model generation for smartphones," 2010 IEEE/ACM/IFIP International Conference on Hardware/Software Codesign and System Synthesis (CODES+ISSS), Scottsdale, AZ, 2010, pp. 105-114. See e.g. Abstract at p. 1, § 7 Power Estimation Tool at 10, Fig. 13.
Flinn, Jason, and Mahadev Satyanarayanan. "Powerscope: A tool for profiling the energy usage of mobile applications." In Mobile Computing Systems and Applications, 1999. Proceedings. WMCSA'99. Second IEEE Workshop on, pp. 2-10. IEEE, 1999. See e.g. Abstract at 1, Figs. 3(a)-(c) at 4, § 3.4 The Energy Analyzer at 5.
Yoon, Chanmin, et al. "AppScope: Application Energy Metering Framework for Android Smartphone Using Kernel Activity Monitoring." USENIX Annual Technical Conference. vol. 12.2012. See e.g. pp. 2-3, 6, 16-17, 28-31.
Invalidity contentions of U.S. Pat. No. 9,516,127 in view of U.S. Patent Pub No. US2010/0250986.
Invalidity contentions of U.S. Pat. No. 9,516,127 in view of Alpert, U.S. Pat. Pub. No. 2010/0317374.
Invalidity contentions of U.S. Pat. No. 9,516,127 in view of Balasubramanian, U.S. Pat. Pub. No. 2007/0286222.
Invalidity contentions of U.S. Pat. No. 9,516,127 in view of, "Application-Driven Power Management for Mobile Communication" by R. Kravets and P. Krishnan (Jul. 2000).
Invalidity contentions of U.S. Pat. No. 9,516,127 in view of Luna, U.S. Pat. Pub. No. 2013/0010693.
Invalidity contentions of U.S. Pat. No. 9,516,127 in view of U.S. Pat. No. 8,886,176.
Invalidity contentions of U.S. Pat. No. 9,516,127 in view of European Patent Publication No. EP 2343930.
Invalidity contentions of U.S. Pat. No. 9,516,127 in view of U.S. Pat. No. 9,043,433.
Invalidity contentions of U.S. Pat. No. 9,516,127 in view of U.S. Pat. App. Pub. No. 2012/0272230.
Invalidity contentions of U.S. Pat. No. 9,516,127 in view of U.S. Pat. No. 9,474,022.
Invalidity contentions of U.S. Pat. No. 9,516,127 in view of U.S. Pat. App. Pub. No. 2011/0185202.
Invalidity contentions of U.S. Pat. No. 9,516,127 in view of U.S. Pat. App. Pub. No. 2011/0131321.
Invalidity contentions of U.S. Pat. No. 9,516,127 in view of U.S. Pat. No. 8,943,204.
Invalidity contentions of U.S. Pat. No. 9,516,127 in view of U.S. Pat. No. 9,264,868.
Select pages from Claim Construction Order; *Seven Networks, LLC v. ZTE (USA), Inc. and ZTE Corporation*; Case 3:17-cv-01495-M; Document 207; Filed Oct. 23, 2018 ('127 Patent).
Select pages from Claim Construction Memorandum and Order; *Seven Networks, LLC v. Google LLC; Seven Networks, LLC v.*

(56) References Cited

OTHER PUBLICATIONS

*Samsung Electronics America, Inc. and Samsung Electronics Co., Ltd.*; Case 2:17-cv-00442-JRG; Document 342; Filed Oct. 23, 2018 ('127 Patent).
39843-0046IP1 Petition for Inter Partes Review of U.S. Pat. No. 9,516,127 Pursuant to 35 U.S.C. §§ 311-319, 37 C.F.R. § 42.
39843-0046IP2 Petition for Inter Partes Review of U.S. Pat. No. 9,516,127 Pursuant to 35 U.S.C. §§ 311-319, 37 C.F.R. § 42.
Petition for Inter Partes Review of U.S. Pat. No. 9,516,127.

* cited by examiner

INTELLIGENT ALARM MANIPULATOR AND RESOURCE TRACKER

CROSS-REFERENCE TO RELATED APPLICATION

The present application claims priority to U.S. Utility application Ser. No. 14/223,689 titled "Intelligent Alarm Manipulator and Resource Tracker" filed on Mar. 24, 2014, and benefit from U.S. Provisional Patent Application Ser. No. 61/805,070 titled "Intelligent Alarm Manipulator and Resource Tracker" filed on Mar. 25, 2013, which is expressly incorporated by reference herein.

BACKGROUND

Applications installed on devices such as desktops, laptops, mobile devices, etc., consume resources. The Windows task manager on devices running Windows OS can display information such as a list of applications and processes that are running, CPU usage history, physical memory usage history and network utilization. Similarly, some mobile devices can provide users battery usage information such as how much battery is consumed by the device screen, Wi-Fi connection, etc., and/or per application statistics such as memory used, amount of data downloaded/uploaded, etc. However, this type of information is typically displayed for the user to see, but is not actionable by either the device or a user of the device. For example, if a user observes that an application is using the network, other than taking extreme actions like disconnecting from the network or force closing the application, the user has no option to control how the application uses the network.

BRIEF DESCRIPTION OF THE DRAWINGS

FIGS. 1A-2 and 1A-3 depict timing diagrams illustrating trigger profiles, network activity profiles and power consumption profiles before and after optimization by the intelligent alarm manipulator and resource tracker.

FIG. 1I depicts an example diagram illustrating data flows between example client side components in a distributed proxy and cache system.

FIG. 2 depicts example components of a mobile device having the intelligent alarm manipulator and resource tracker.

FIG. 3 depicts an example flow diagram illustrating a method of intelligent alarm manipulator and resource tracker.

DETAILED DESCRIPTION

Figures 1, 1A:
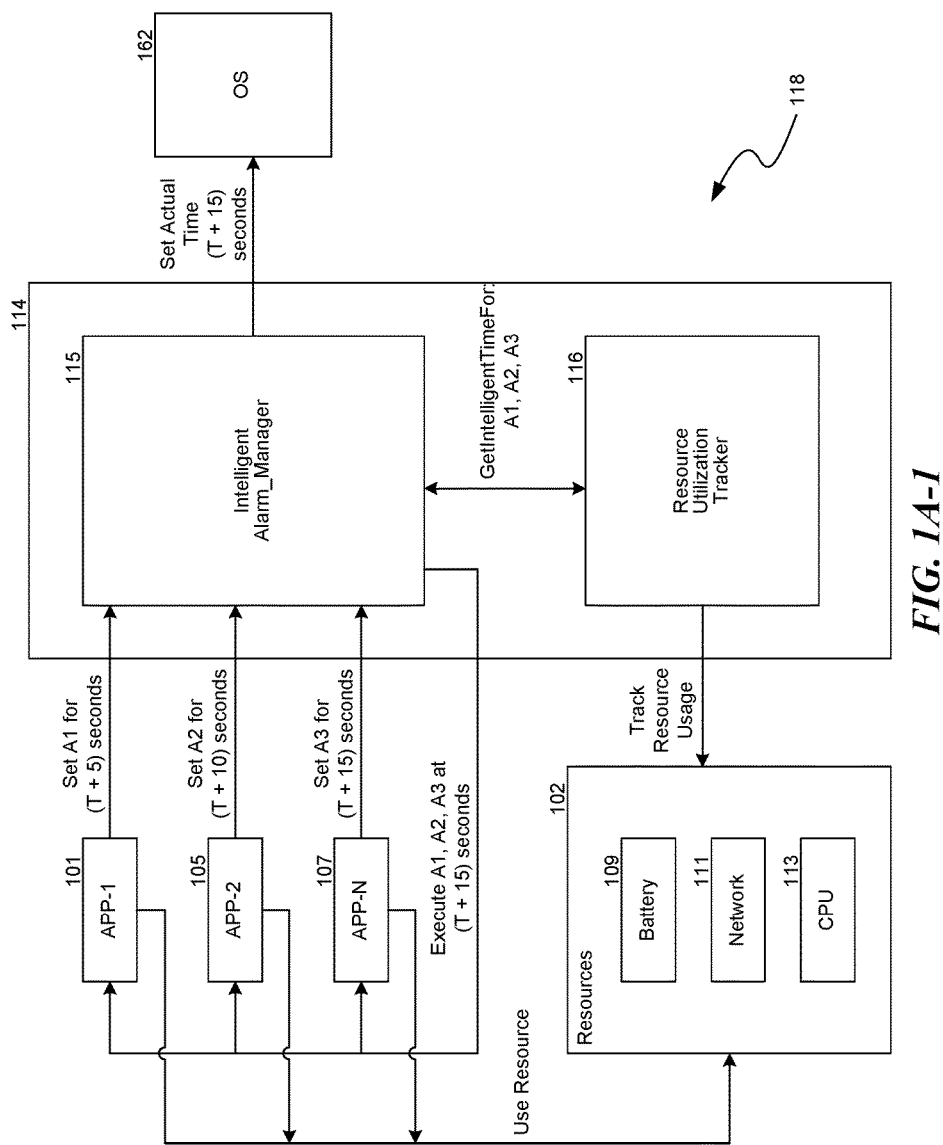
FIG. 1A-1 depicts a diagram illustrating example resource utilization tracking and intelligent alarm management of alarms/timers of multiple applications on a mobile device via the intelligent alarm manipulator and resource tracker.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for intelligently manipulating alarms/timers to optimize resource usage on a mobile device.

Embodiments of the present disclosure include systems and methods to analyze, examine, evaluate, determine, detect and/or discern and document associations between alarms/timers from multiple applications and the results usage of resources such as, but not limited to, battery or power, network, CPU, memory, and the like, when the triggers are fired off, and use the associations to manipulate the alarms/timers to occur at an optimal time to, for example, more efficiently utilize resources.

One embodiment of the present disclosure includes a method for managing resources on a mobile device. The method comprises tracking triggers from multiple applications and use of resources resulting from the triggers on the mobile device, determining associations between the triggers and the use of resources, and manipulating, based on the associations, some or all of the triggers to fire off at the same time to optimize the use of resources by the triggers.

In one implementation, the method comprises manipulating some or all of the triggers by delaying the first and subsequent riggers to fire off at the same time as the last trigger. In another implementation, the method comprises manipulating some or all of the triggers by delaying at least one trigger and accelerating at least one trigger.

In one implementation, the method comprises identifying a specific type of trigger from the triggers, and based on the associations and the specific type of trigger, delaying the specific type of trigger for a time period. In one implementation, the associations are based on time based analysis, frequency based analysis or time and frequency based analysis of the triggers and the use of resources.

In one implementation, the method further comprises detecting a pattern in which a trigger fires off and based on the pattern, manipulating the trigger to delay the trigger from firing off during a period of time. The trigger can be an alarm that brings the mobile device out of sleep mode in one implementation.

One embodiment of the present disclosure provides a mobile device capable of performing resource management to optimize use of resources on the mobile device. The mobile device can track triggers from multiple applications and corresponding use of a network resource resulting from the triggers on the mobile device, determine correlations between the triggers and the corresponding use of the network resource and manipulate, based on the correlations, timing of some or all of the triggers to optimize the use of the network resource on the mobile device. In one implementation, the correlations are based on time analysis, frequency analysis or time and frequency analyses of the triggers and the use of the network resource.

The triggers can include alarms and/or timers and can be used to perform scheduled tasks that use the network resource on the mobile device. The manipulation of timing of the triggers can also optimize the use of battery, CPU and memory resources.

In one implementation, the manipulation of timing of some or all of the triggers includes delaying at least one trigger or accelerating at least one trigger. In another implementation, manipulating timing of some or all of the triggers includes modifying initial values of the corresponding triggers in the operating system.

In one implementation, the mobile device can determine, from the tracking, patterns in which the triggers fire off, and use the patterns in manipulating the timing of some of the triggers to prevent the triggers from firing off when user activity is not predicted or when the battery level is below a threshold.

One embodiment of the present disclosure provides a resource management system for optimizing use of resources on a mobile device. The system can include an intelligent alarm manager that tracks triggers from multiple applications and a resource utilization tracker that tracks corresponding use of a network resource resulting from the triggers on the mobile device. The system includes an alarm-resource association detector 220 that can determine correlations between the triggers and the corresponding use of the network resource. The system also includes an alarm manipulator that can manipulate, based on the correlations, timing of some or all of the triggers to optimize the use of the network resource (or multiple network resources) on the mobile device. In one implementation, the correlations are based on time analysis, frequency analysis or time and frequency analyses of the triggers and the use of the network resource.

The triggers can include alarms or timers and can be used to perform scheduled tasks that use the network resource on the mobile device. The manipulation of timing of the triggers can also optimize the use of battery, CPU and memory resources.

In one implementation, the alarm manipulator can manipulate timing of some or all of the triggers by delaying at least one trigger or accelerating at least one trigger. In another implementation, the alarm manipulator can manipulate timing of some or all of the triggers by modifying initial values of the corresponding triggers in the operating system.

In one implementation, a resource usage pattern detector can determine, from the tracking, patterns in which the triggers fire off, and the patterns can be used by the alarm manipulator in manipulating the timing of some of the triggers to prevent the triggers from firing off when user activity is not predicted or when the battery level is below a threshold.

One embodiment of the present disclosure includes a computer-readable storage medium storing instructions that when executed by a processor causes the processor to track triggers from multiple applications and corresponding use of a network resource resulting from the triggers on a mobile device, determine correlations between the triggers and the corresponding use of the network resource and manipulate, based on the correlations, timing or frequency of some or all of the triggers to synchronize at least some of the triggers to optimize the use of the network resource on the mobile device.

In one implementation, the triggers include alarms or timers that perform scheduled tasks and utilize the network resource on the mobile device. In another implementation, manipulating timing or frequency of some or all of the triggers includes modifying initial values of the corresponding triggers in the operating system. The manipulation of timing of the triggers can further optimize the use of battery, CPU, memory and/or other resources.

As used herein, triggers include alarms and timers used for performing scheduled tasks. Triggers, alarms and timers have been used interchangeably herein. The scheduled tasks can use resources such as, but not limited to: battery/power, network, CPU, memory or a combination thereof.

These and various other embodiments and implementations of the disclosed systems and methods are described in the following sections.

FIG. 1A-1 depicts a diagram 118 illustrating example resource utilization tracking and intelligent alarm management of triggers across multiple applications on a mobile device via an intelligent alarm manipulator and resource tracker module 114 having an intelligent alarm manager 115 and a resource utilization tracker 116. In some implementations, the functionality of the intelligent alarm manager 115 and the resource utilization tracker 116 may be distributed across more or less components.

Applications 101, 105 and 107 are example applications of a mobile device. The applications can set alarms for different times to perform different tasks. For example, application 101 sets an alarm A1 for T+5 seconds, application 105 sets an alarm A2 for T+10 seconds and application 107 sets an alarm A3 for T+15 seconds. The alarms A1, A2 and A3 are intercepted and/or tracked by the intelligent alarm manager 115. The alarms A1, A2 and A3 use resources 102, including but not limited to: battery 109, network 111, CPU 113, or the like, when they fire off. The resource utilization tracker 116 tracks or monitors the usage of various resources by the alarms A1, A2 and A3 or tasks triggered by the alarms. For example, assuming that the alarm A1 wakes up the mobile device from the sleep mode, when the alarm A1 is triggered, the mobile device's battery/power resource and CPU resource can be utilized.

The intelligent alarm manager 115 queries a resource utilization tracker 116 to get intelligent time and/or resource utilization information from the resource utilization tracker 116. The intelligent alarm manager 115 determines associations between alarms A1, A2 and A3 and resource usage based on the received information, and determines an actual or optimal time at which the alarms A1, A3 and A3 can be triggered to optimize resource utilization. The intelligent alarm manager 115 manipulates the alarms A1, A3 and A3 to, for example, T+15 seconds and sets this time in the operating system (OS) 162. The alarms A1, A2 and A3 then execute at the manipulated time of T+15 seconds or substantially close to the manipulated time of T+15 seconds. When the alarms execute, the applications use resources such as resources 102.

FIGS. 1A-2 and 1A-3 depict timing diagrams illustrating trigger profiles, network activity profiles and power consumption profiles before and after optimization by the intelligent alarm manipulator and resource tracker.

Figures 1, 1A, 2:
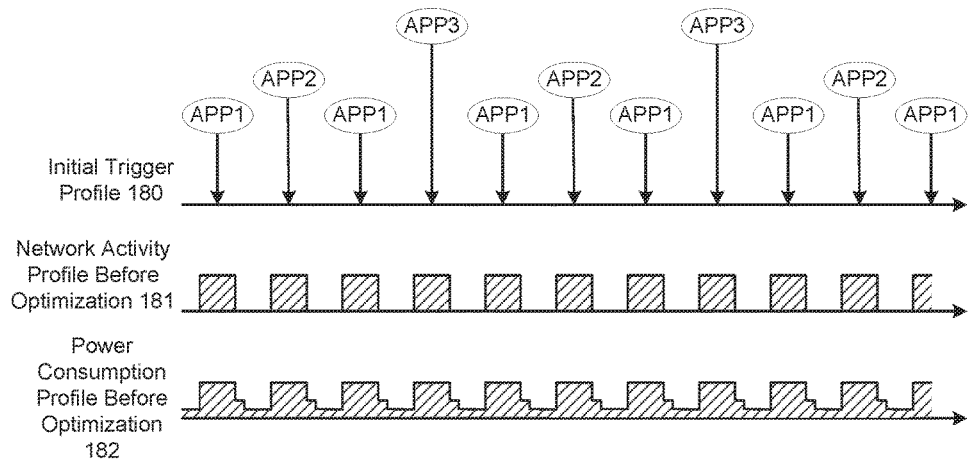

Referring to FIG. 1A-2, an initial profile timing diagram 180 illustrates three applications APP1, APP2 and APP3 triggering their alarms/timers at different times, as observed or tracked by the intelligent alarm manager 115. The resource utilization tracker 1A-3 tracks the resource use to determine whether the alarms/timers lead to network activity, power consumption, or other resource use. In this example, the network activity profile 181 shows corresponding network activity triggered by the alarms/timers from the trigger profile 180. The network activity can include, for example, turning on or powering of radio of the mobile device, establishing a network connection, uploading/downloading data over the network connection, etc. Corresponding to the network activity profile 181, is the power consumption profile 182 that shows the power consumption pattern on the mobile device before optimization.

Referring to FIG. 1A-3, the optimized trigger profile 183 shows that the timing of the alarms/timers of the three applications have been adjusted or manipulated such that some of the alarms/timers are triggered at the same time or at approximately the same time. The network activity profile 184 shows that there are fewer connections over the same period of time and more amount of data can be transmitted or received per connection. The power consumption profile 186 also shows improvement in the amount of power consumed. Typically, when a radio transitions from an idle state to a high power state, the power consumption rises from the lowest level to the maximum level. After the network activity is completed, the power consumption drops to a lower level before finally dropping to the lowest level corresponding to the idle state. By having fewer radio state transitions, and by sending/receiving a larger amount of data per radio connection by manipulating the alarms/timers, the overall power consumption can be reduced.

Figures 1, 1A, 2, 3:
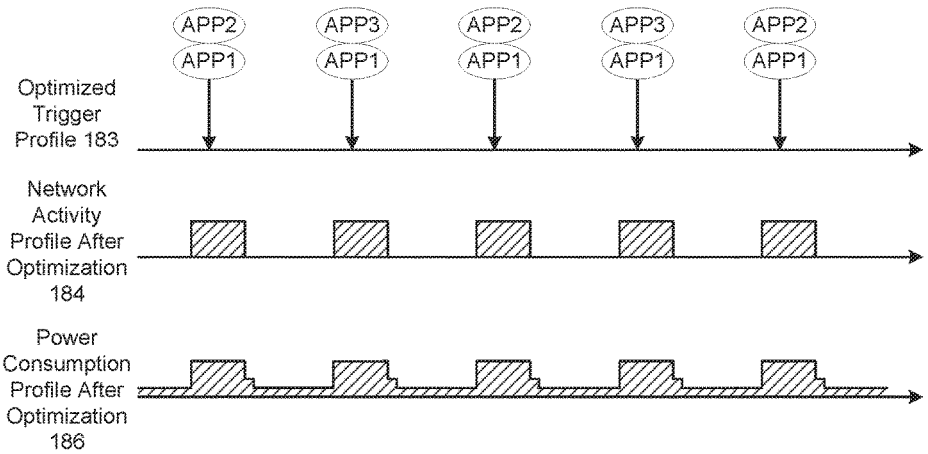
Figure 1B:
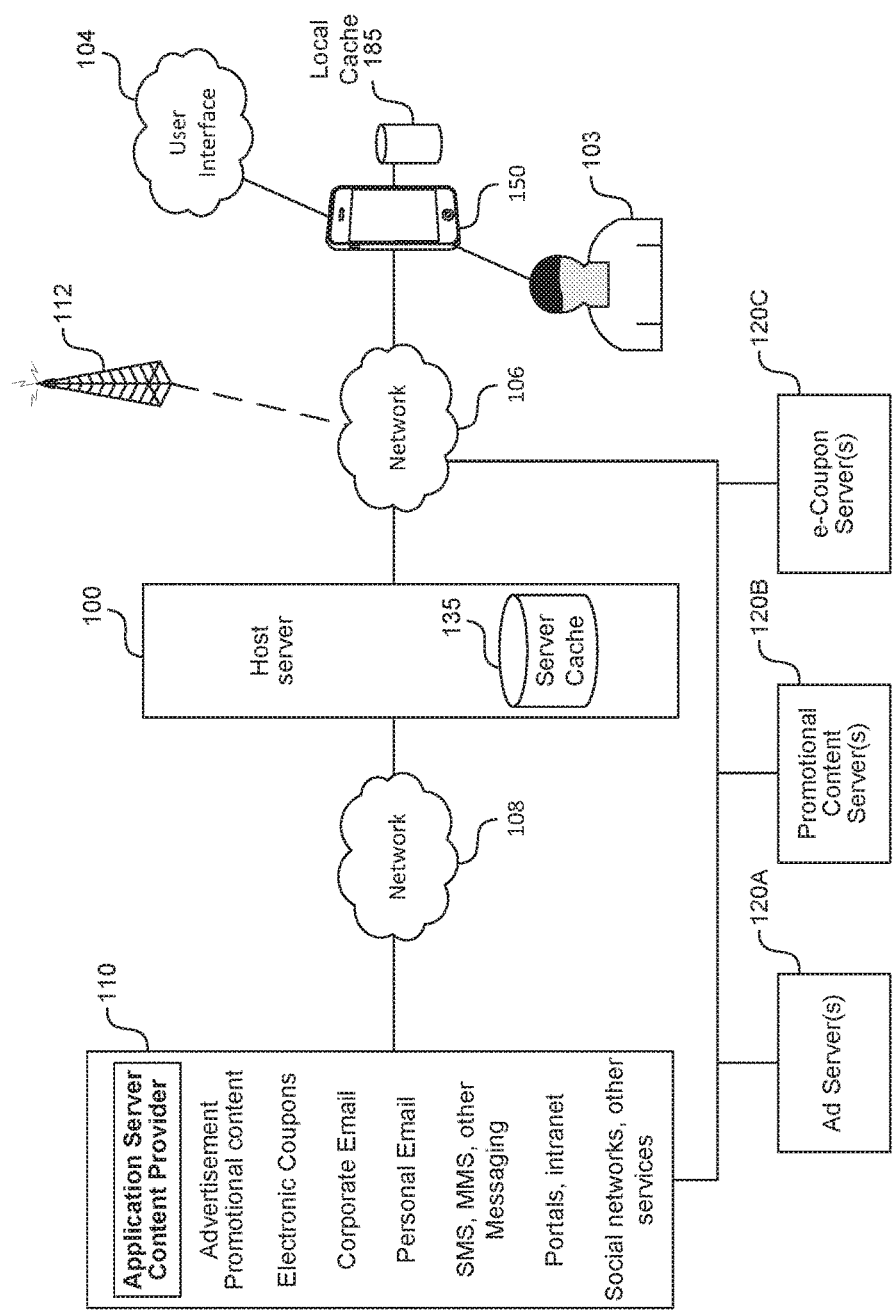
FIG. 1B illustrates an example diagram of a system where a host server facilitates management of traffic, content caching, and/or resource conservation between mobile devices (e.g., wireless devices), an application server or content provider, or other servers such as an ad server, promotional content server, or an e-coupon server in a wireless network (or broadband network) for resource conservation.

FIG. 1B illustrates an example diagram of a system where a host server 100 facilitates management of traffic, content caching, and/or resource conservation between mobile devices (e.g., wireless devices 150), and an application server or content provider 110, or other servers such as an ad server 120A, promotional content server 120B, or an e-coupon server 120C in a wireless network (or broadband network) for resource conservation. The host server can further interact with mobile or client devices 150 for getting reports and/or updates on resource usage, savings, and the like.

The client devices 150 can be any system and/or device, and/or any combination of devices/systems that is able to establish a connection, including wired, wireless, cellular connections with another device, a server and/or other systems such as host server 100 and/or application server/content provider 110. Client devices 150 will typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

For example, the client devices 150 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a BLACKBERRY device, a TREO, a handheld tablet (e.g. an IPAD, a GALAXY, XOOM Tablet, etc.), a tablet PC, a thin-client, a hand held console, a hand held gaming device or console, an IPHONE, a head mountable device, and/or any other portable, mobile, hand held devices, etc., running on any platform or any operating system (e.g., MAC-based OS (OS X, iOS, etc.), WINDOWS-based OS (WINDOWS MOBILE, WINDOWS 7, etc.), ANDROID, BLACKBERRY OS, Embedded LINUX platforms, Palm OS, SYMBIAN platform. In one embodiment, the client devices 150 and the host server 100, are coupled via a network 106. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request) and/or optimize resource usage on the mobile device. In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device-side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 150 behaviors and/or timing of triggers. The device 150 can also request the host server 100 to alter the behavior for network resource consumption based on user activity or behavior.

In one embodiment, the traffic management for resource conservation is performed using a distributed system between the host server 100 and client device 150. The distributed system can include proxy server and cache components on the server side 100 and on the device/client side, for example, as shown by the server cache 135 on the server 100 side and the local cache 185 on the client 150 side.

Functions and techniques disclosed for context aware traffic management for resource conservation in networks (e.g., network 106 and/or 108) and devices 150, can reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1C.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 can be any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G, 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1C:
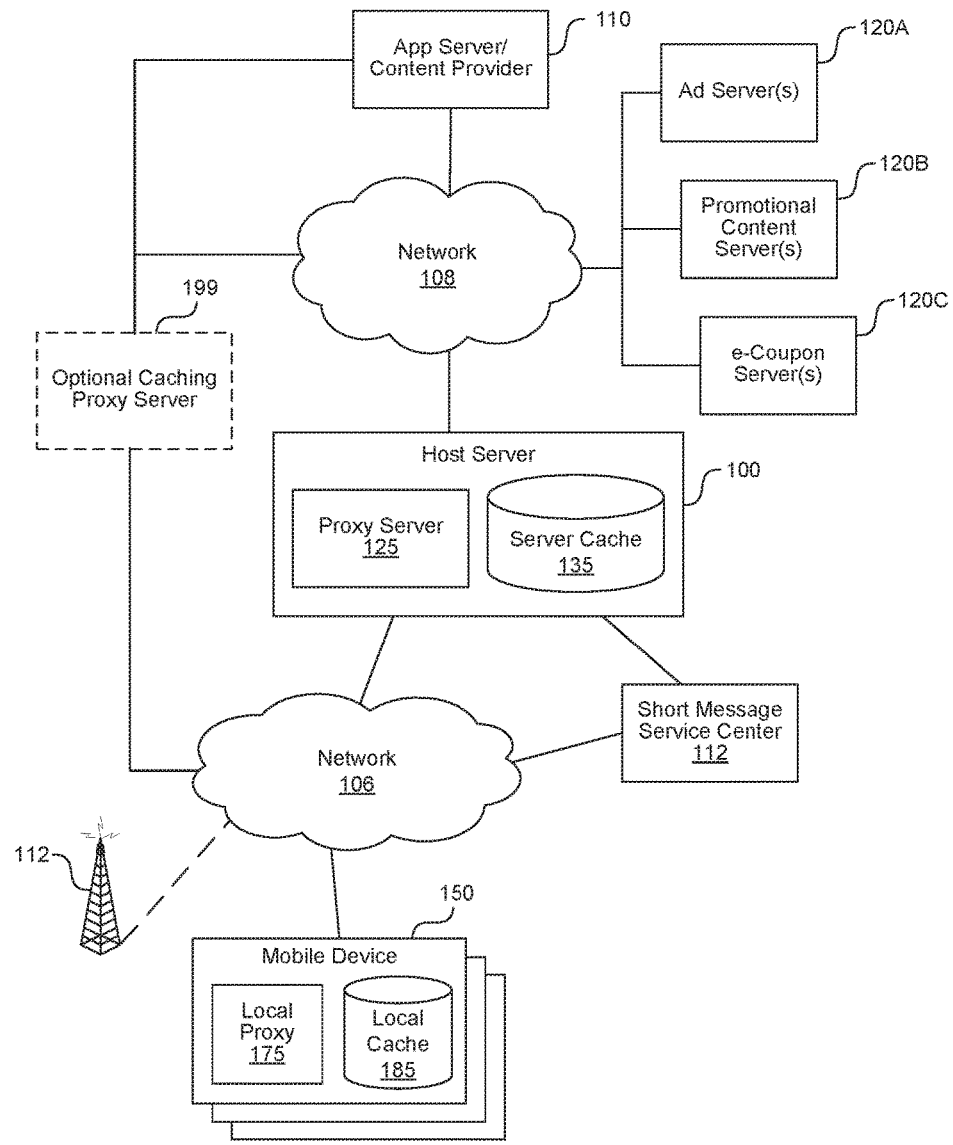
FIG. 1C illustrates an example diagram of a proxy and cache system distributed between the host server and device which facilitates network traffic management between a device, an application server or content provider, or other servers such as an ad server, promotional content server, or an e-coupon server for resource conservation and content caching. The proxy system distributed among the host server and the device can further track alarms/timers and resources used by such alarms/timers to determine associations using which the proxy system can manipulate the alarms/timers to occur at an optimal time to reduce resource usage.

FIG. 1C illustrates an example diagram of a proxy and cache system distributed between the host server 100 and device 150 which facilitates network traffic management between the device 150 and an application server or content provider 110, or other servers such as an ad server 120A, promotional content server 120B, or an e-coupon server 120C for resource conservation and content caching The proxy system distributed among the host server 100 and the device 150 can further track alarms/timers implemented by applications on a device and resources used by such alarms/timers to determine associations using which the proxy system can manipulate the alarms/timers to occur at an optimal time to reduce resource usage.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission to the proxy server 125, when appropriate.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that 112 can also utilize any other type of alternative channel including USSD or other network control mechanisms. The host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 1D:
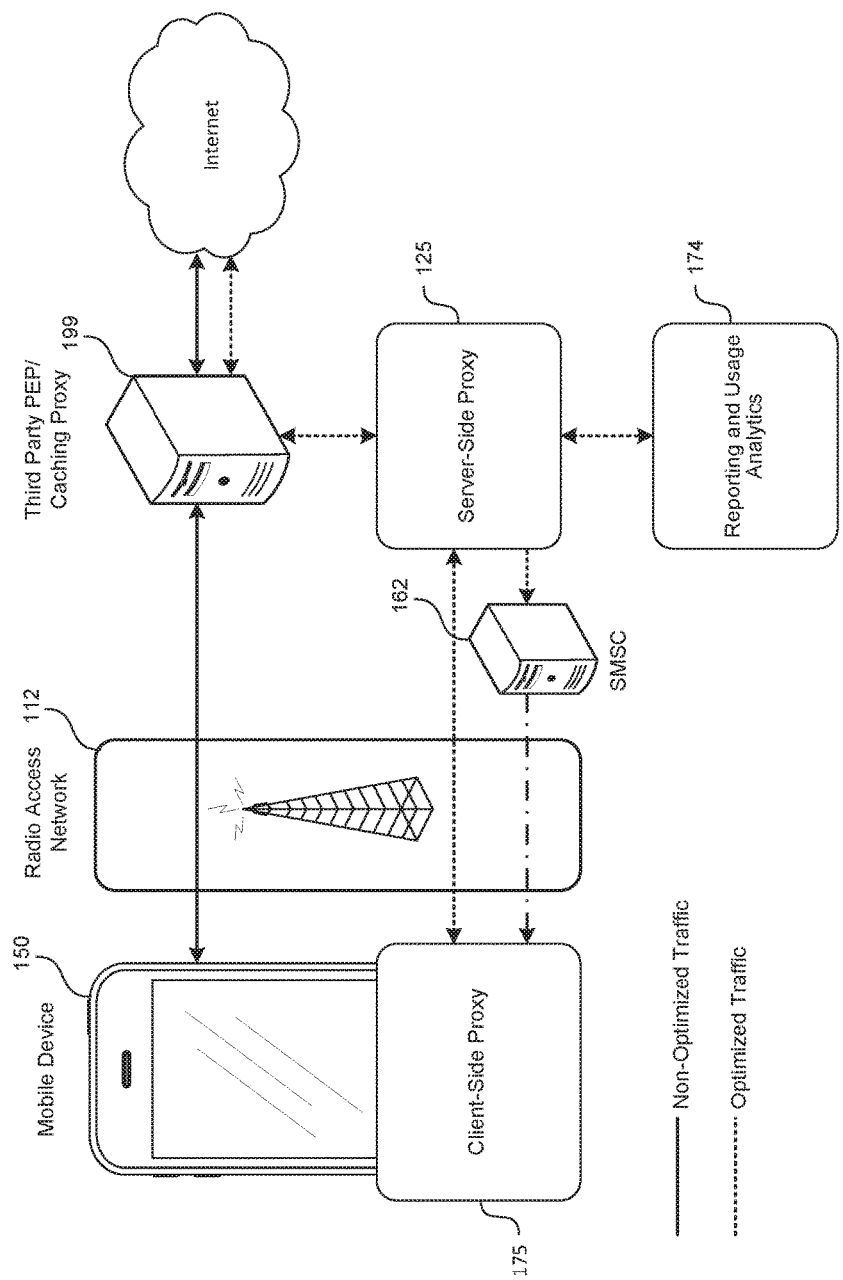
FIG. 1D illustrates an example diagram of the logical architecture of a distributed proxy and cache system.

FIG. 1D illustrates an example diagram of the logical architecture of a distributed proxy and cache system. The distributed system can include, for example the following components:

Client Side Proxy 175: a component installed in the smartphone, mobile device or wireless device 150 that interfaces with device's operating system, as well as with data services and applications installed in the device. The client side proxy 175 is typically compliant with and able to operate with standard or state of the art networking protocols.

The server side proxy 125 can include one or more servers that can interface with third party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third party servers.

Reporting and Usage Analytics Server 174: The Reporting and Usage Analytics system or component 174 can collect information from the client side 175 and/or the server side 125 and provides the necessary tools for producing reports and usage analytics can used for analyzing traffic and signaling data. Such analytics can be used by the proxy system in managing/reducing network traffic or by the network operator in monitoring their networks for possible improvements and enhancements. Note that the reporting and usage analytics system/component 174 as illustrated, may be a server separate from the server-side proxy 125, or it may be a component of the server-side proxy 125, residing partially or wholly therein.

Figure 1E:
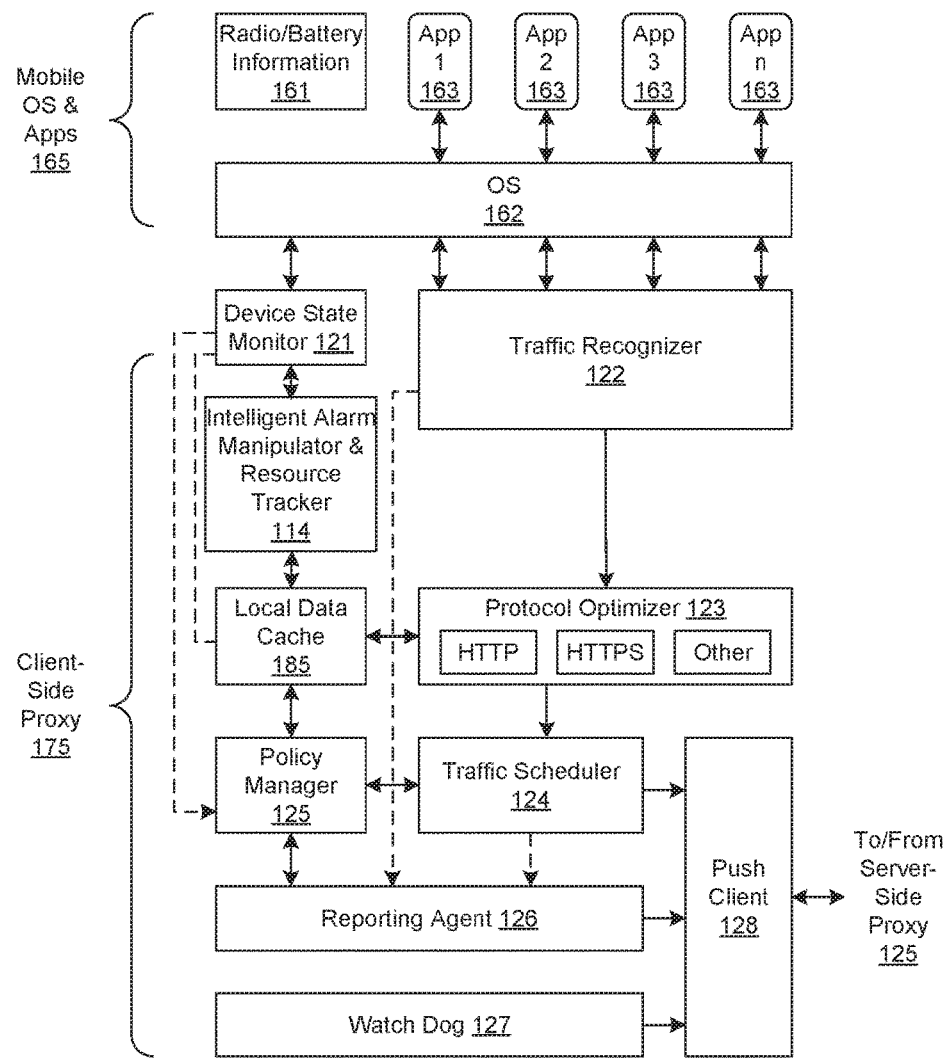
FIG. 1E illustrates an example diagram showing the architecture of client side components in a distributed proxy and cache system.

FIG. 1E illustrates an example diagram showing the architecture of client side components in a distributed proxy and cache system.

The client side components 175 can include software components or agents installed on the mobile device that enables traffic optimization and performs the related functionalities on the client side. Components of the client side proxy 175 can operate transparently for end users and applications 163. The client side proxy 175 can be installed on mobile devices for optimization to take place, and it can effectuate changes on the data routes. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests. Some example components of the client side proxy 175 are described as follows:

Device State Monitor 121: The device state monitor 121 can be responsible for identifying several states and metrics in the device, such as network status, display status, battery level, etc. such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic optimization and reporting policies provisioned by a Policy Management Server (PMS). At the client side proxy 175 first start, traffic optimization and reporting policies (policy profiles) that is to be enforced in a particular device can be provisioned by the Policy Management Server.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information about the events taking place in the device and sends the information to the Reporting Server. Event details are stored temporarily in the device and transferred to reporting server only when the data channel state is active. If the client side proxy 175 doesn't send records within twenty-four hours, the reporting agent 126 may attempt to open the connection and send recorded entries or, in case there are no entries in storage, an empty reporting packet. All reporting settings are configured in the policy management server.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a reporting server (e.g., the reporting and/or usage analytics system which may be internal to or external to the server side proxy 125).

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

The intelligent alarm manipulator and resource tracker 114, which is described in detail in FIG. 2, can monitor and track triggers from multiple applications on the mobile device 150 and corresponding usage of resources to determine correlations between triggers and resource usage and use such correlations to manipulate the timing of triggers to conserve resources on the mobile device.

Figure 1F:
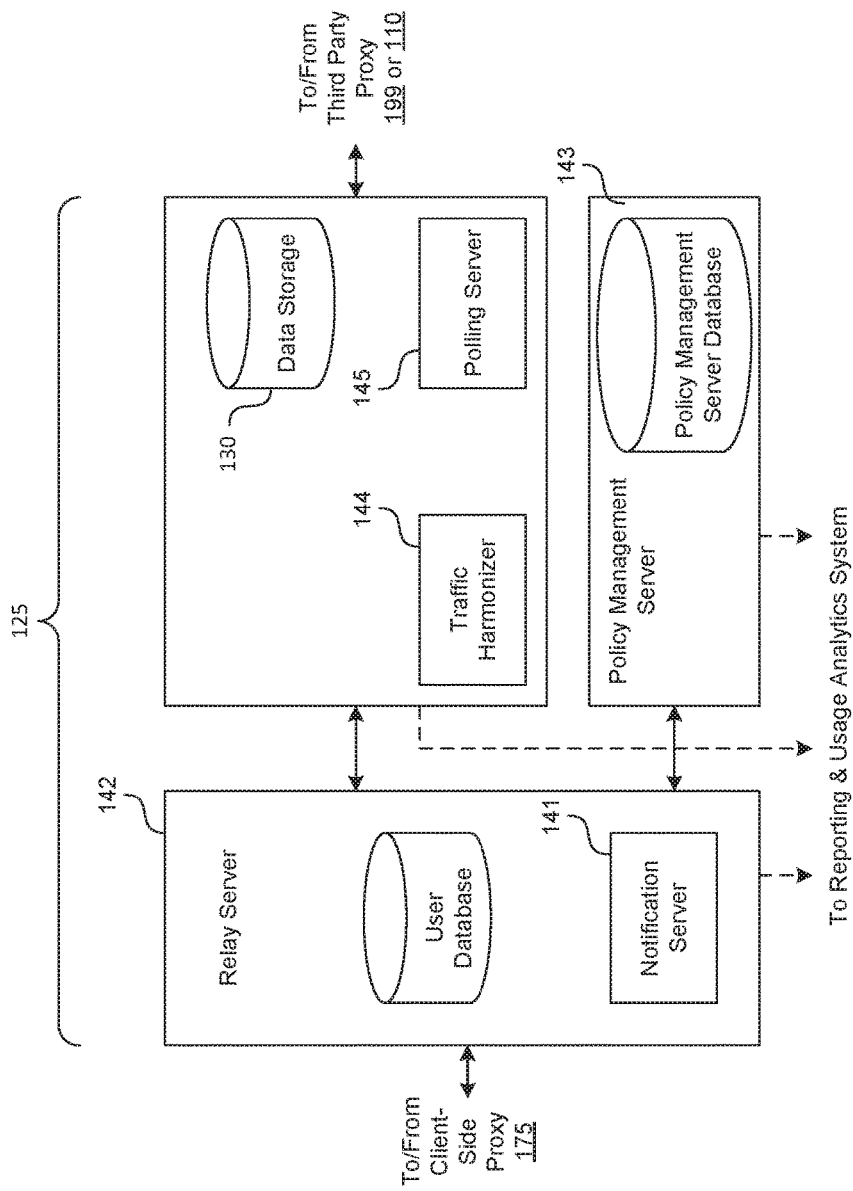
FIG. 1F illustrates an example diagram of the example components on the server side of the distributed proxy and cache system.

FIG. 1F illustrates a diagram of the example components on the server side of the distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, or other third party (e.g., application server/service provider 110 and/or other proxy 199) and/or a reporting and usage analytics system. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports, provisioning, platform setup, and so on.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Reporting and Usage Analytics Component: The Reporting and Usage Analytics component or system collects information from the client side 175 and/or from the server side 125, and provides the tools for producing reports and usage analytics that operators can use for analyzing application signaling and data consumption.

Most mobile applications regularly poll their application servers to check for new data. Often there is no new data or the content has not changed, so the exchange of data through the mobile network is unnecessary. As the number of mobile phones and their applications increase, the amount of this needless polling grows. Since applications are not coordinated and poll at different times and intervals, any given phone may frequently generate signal traffic. This causes multiple unnecessary radio activations, consuming power and shortening battery life.

Figure 1G:
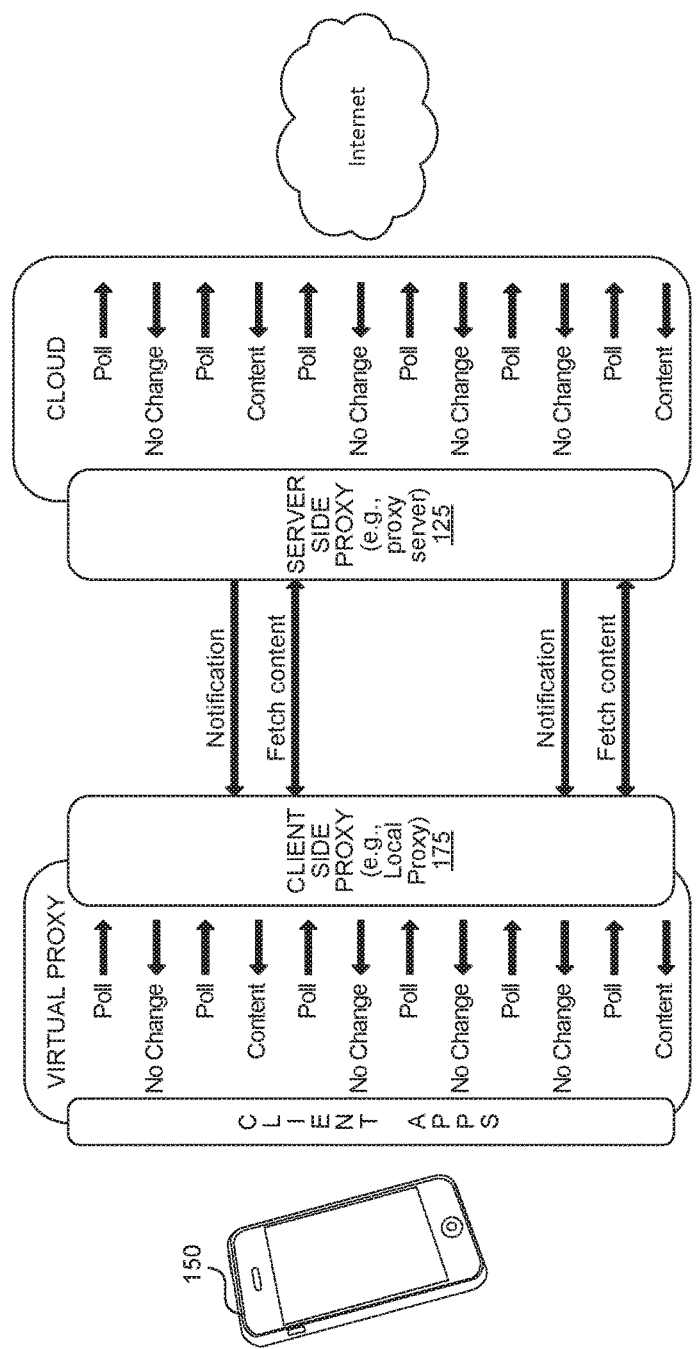
FIG. 1G illustrates an example diagram of a signaling optimizer of the distributed proxy and cache system.

In one embodiment, a signaling optimizer reduces network requests to a minimum by caching content in the client and letting its own server poll for changes in the network. When a mobile phone's client side proxy (e.g., local proxy) 175 detects a recurring pattern for a resource, such as an email application, its response content is stored locally in a client cache so similar requests from that application get their response from the local cache, rather than signaling the network, as illustrated in the example diagram of FIG. 1G. The server-side proxy (e.g., the proxy server) 125 can poll for changes in the network. When new content or updated content is detected from the polling, the server-side proxy 125 can send a notification to the client-side proxy 175. In response to the notification of new or updated content, the client-side proxy 175 allows the request from the application to go to its application server such that new or updated content can be fetched.

As an example, someone who typically gets only 10 emails a day may have phone's email application poll the network for new email every 15 minutes, or 96 times a day, with around 90% or more of the polls resulting in the same response: there are no new emails. The client side proxy (e.g., local proxy) 175 can recognize this request—response pattern, and intercept the application's poll requests, returning the locally cached response of "no new emails". This way the device radio is not turned on by this particular application, and the poll doesn't use any network resources. The server (e.g., host server 100, proxy server 125), located in the network, can monitor the email application server on behalf of the user's email application. When new email is available, the server can notify the user's client side proxy 175 to not use the cached "no new emails" response for the next poll request. Instead of going to the local client cache, the email application polls its application server over the network and receives the new content.

The signaling optimizer can be configured and managed using different rule sets for different device types, user types, wireless networks, and applications. Optimization rules can be updated at any time, so the changes can be applied immediately when an application upgrades or changes happen in the mobile network. The protocols that can be optimized include, but are not limited to: HTTP, HTTPS and DNS.

In one embodiment, systems and methods of intelligent alarm manipulator and resource tracker can be used alone or in combination with the signaling optimizer to further reduce network requests by consolidating or changing the timing of requests such that use of resources including network, battery, CPU, memory and the like is reduced.

In the example above, when the server-side proxy 125 notifies the user's client side proxy 175 to not use the cached "no new emails" response for the next poll request and in response, the email application polls its application server over the network to receive the new content, the intelligent alarm manipulator can manipulate the timing of that poll request and/or poll requests from other applications (e.g., weather app, sports new app) such that the poll request from the email application coincides with other poll requests from other applications. When the poll requests from multiple applications are synchronized, the amount of data transmitted per connection can be maximized and the number of radio activations can be reduced. Other resources such as power resources can be conserved and CPU efficiency can be increased.

Figure 1H:
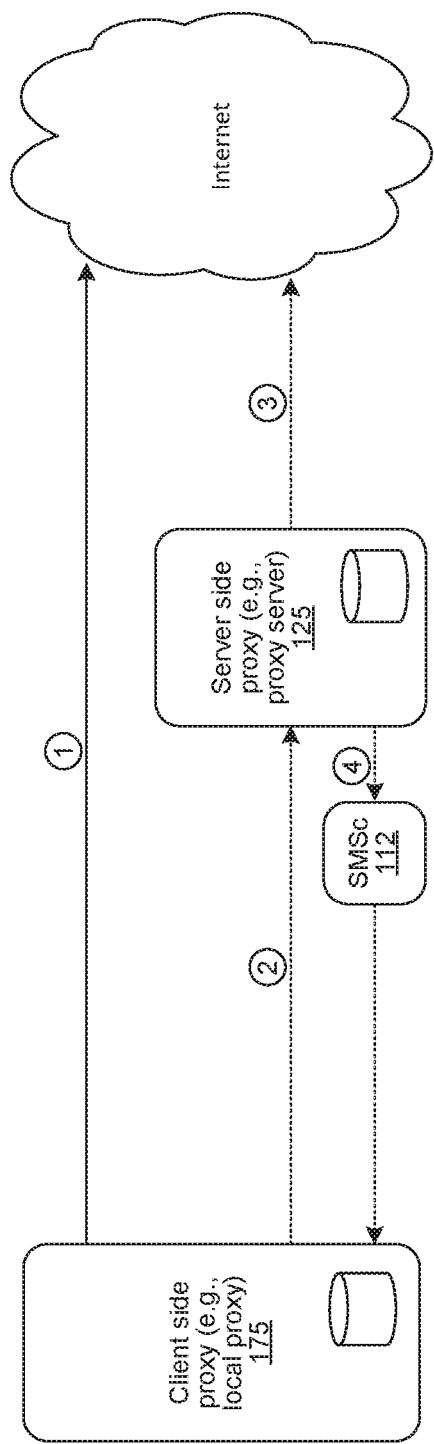
FIG. 1H illustrates an example diagram of an example client-server architecture of the distributed proxy and cache system.
Figure 11:
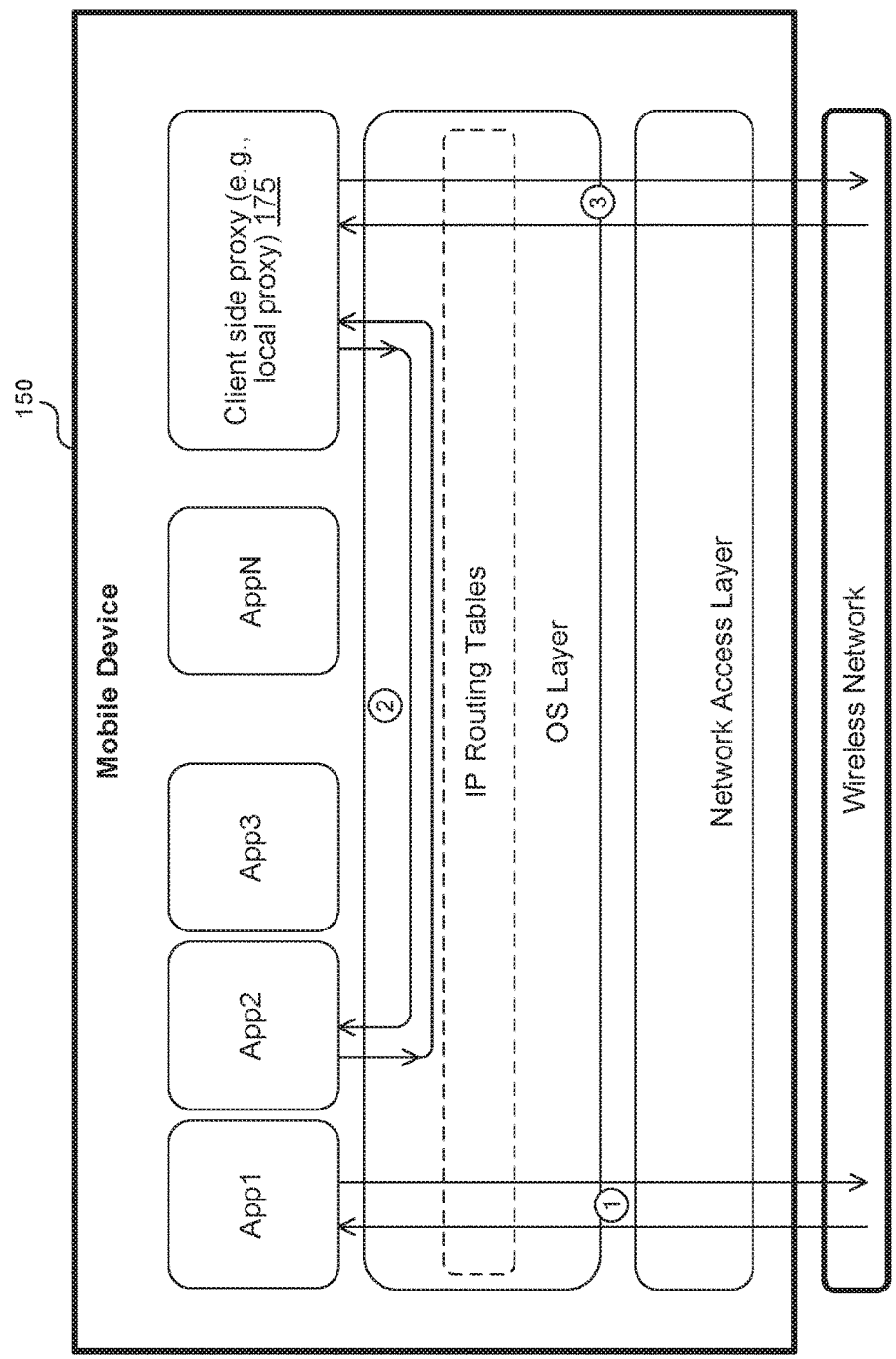
Figure 2:
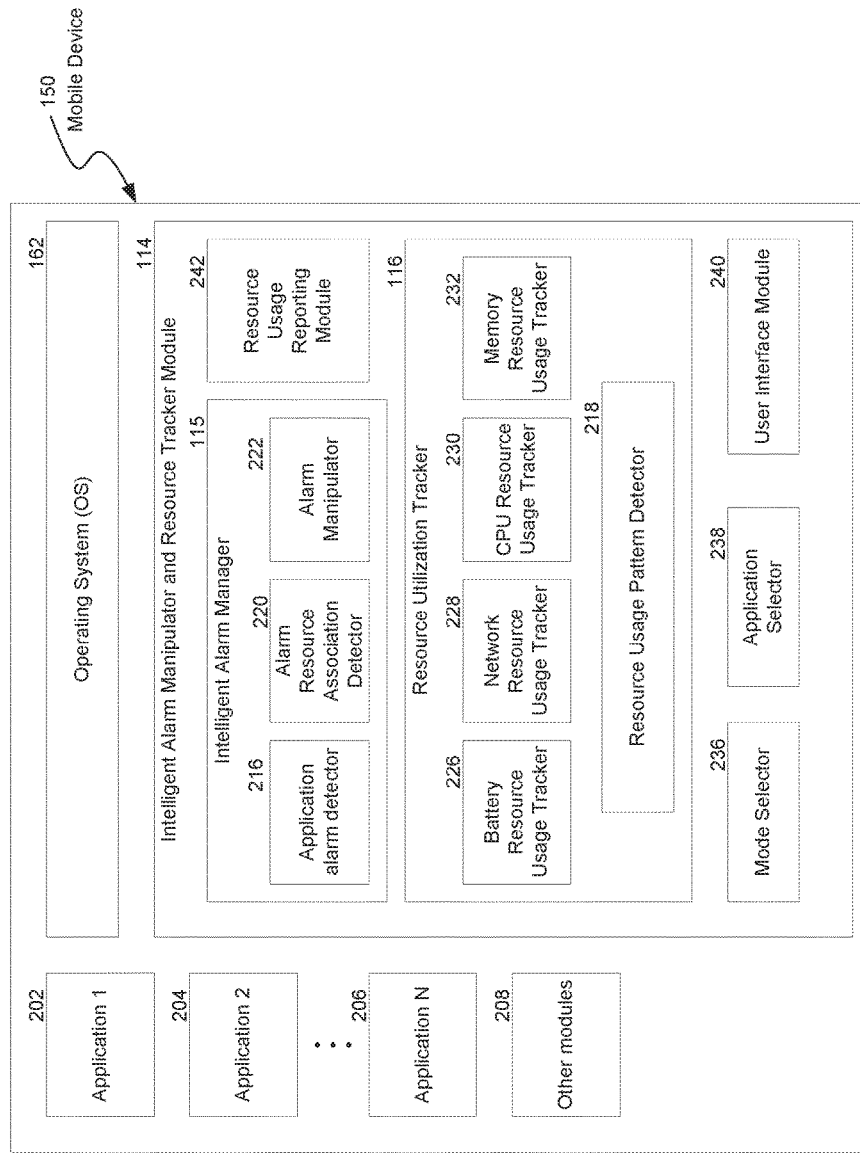
Figure 3:
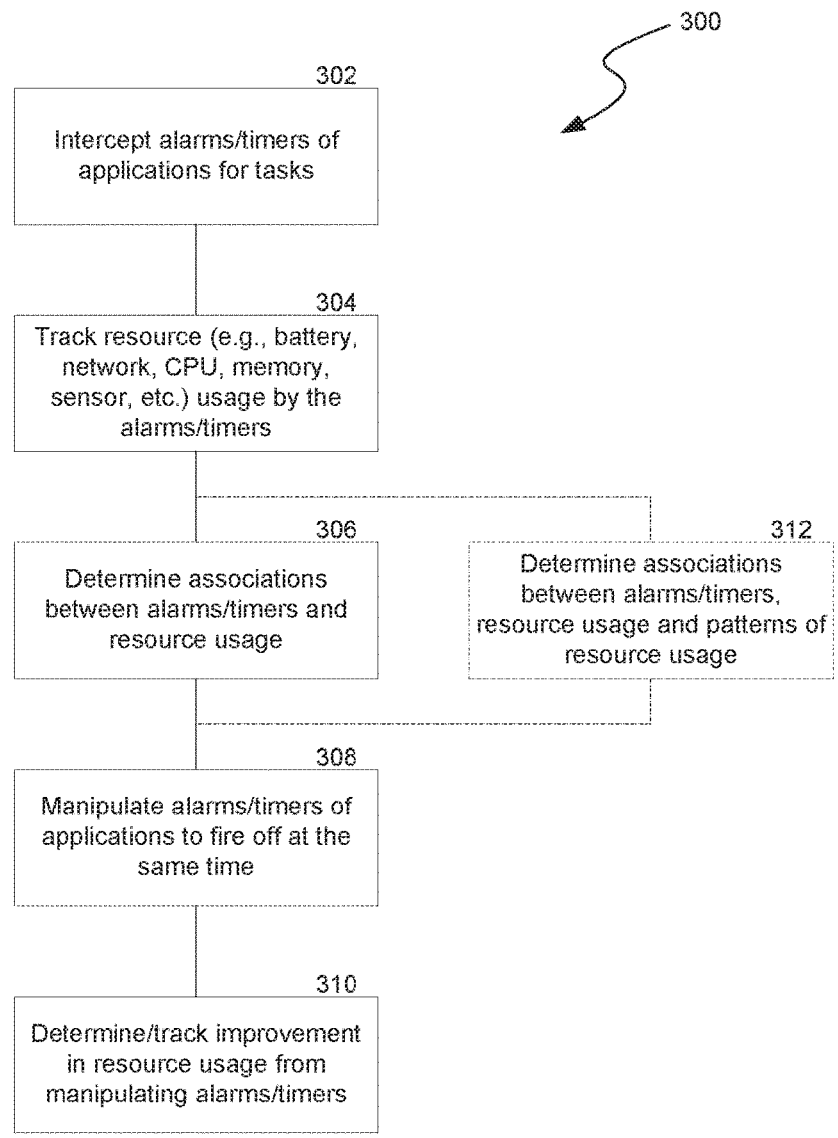

FIG. 1H illustrates an example diagram of an example client-server architecture of the distributed proxy and cache system.

In the client-server architecture, the client side proxy 175 (e.g., local proxy) is residing on the mobile or client devices. The client side proxy 175 can communicate both directly to the Internet (usually via an operator proxy) and to the server side proxy (e.g., proxy server) 125, or the host server 100. The proxy server 125 communicates to the Internet and to the operator's SMSC 112.

As depicted, the client side proxy 175 can send a request directly to the Internet. This can happen after requests have been analyzed to detect optimizable patterns, for example. The client side proxy 175 can, in one implementation, send a request to the server (e.g., host server 100, proxy server 125), for example, to initiate server polling, to reports logs or to get new configuration. The proxy server 125 can send a request to the Internet to, for example, validate cached content. In one implementation, the proxy server 125 can send a request to the SMSC 112, for example, to send a cache invalidate message or policy update message to the client-side proxy 175.

In one implementation, the client side proxy 175 may not maintain an open connection with the proxy server 125, but may connect to the proxy server 125 only in case there's a need to start polling an origin server 110, to report logs or to get new configuration. For signaling optimizer feature, the proxy server 125 can notify the client side proxy 175 when the content, that has been polled, has changed. The proxy server 125 can send a request to invalidate cache in the client side proxy 125. When the application connects to that particular origin server (e.g., content server 110) the next time, it can first fetch the latest content from the proxy server 125 and then directly connect to the origin server 110. For the policy enforcer and/or the network protector features, the proxy server 125 can notify the client side proxy 175 when there's new configuration to be fetched from the server. When the proxy server 125 needs to communicate with the client side proxy 175, it can use a connection that is already open for some other request. If the connection is not open, the proxy server 125 can send a notification (e.g., SMS) to the client side proxy 175.

FIG. 1I depicts an example diagram illustrating data flows between example client side components in a distributed proxy and cache system. Traffic from applications (e.g., App1, App2, App3 to AppN), client side proxy (e.g., local proxy) 175, IP Routing Tables (e.g., in the Android Operating System Layer), Network Access Layer and Wireless Network are depicted.

In one implementation, non-optimized application traffic flow, such as traffic from App1, can completely bypass the client side proxy 175 components and proceed directly through the operating system layer (e.g., the Android OS layer) and Network Access Layer to the wireless network. Traffic that that is not optimized can include, but is not limited to: rich media, like video and audio, as well as traffic from networks and applications that has been configured to bypass optimization and traffic pending optimization, and the like. In one embodiment, all traffic can be configured to bypass the client side/server side proxy.

In another implementation, optimized application traffic, such as traffic from App2, can be redirected from the application to the client side proxy 175. By default, this can be traffic on ports 80 (HTTP) and 53 (DNS), and selected traffic on port 443 (HTTPS), for example. However, traffic to other ports can be configured to be directed to the client side proxy.

In yet another implementation, traffic flow can be between the client side proxy 175 and the origin servers (e.g., content server 110) via the Internet and/or between the client side proxy 175 and the server side proxy (e.g., proxy server) 125.

FIG. 2 depicts example components of a mobile device 150 having the intelligent alarm manipulator and resource tracker 114. In one embodiment, the mobile device 150 can include one or more applications 202-206, an operating system (OS) 162, other platform specific and/or other modules 208 such as network interface components, sensor components, native applications, user activity detectors, application state detectors (e.g., foreground/background state), other contextual detectors, other components described in FIG. 1E, and the like. The intelligent alarm manipulator and resource tracker module 114, in one embodiment, can include an intelligent alarm manager 115 having an application alarm detector 216, an alarm-resource association detector 220 and an alarm manipulator 220, a resource utilization tracker 116 having a battery resource usage tracker 226, a network resource usage tracker 228, a CPU resource usage tracker 230, a memory resource usage tracker 232 and a resource usage pattern detector 218, a mode selector 236, an application selector 238, a user interface module 240 and a resource usage reporting module 240. Additional or less modules or components can be included in the intelligent alarm manipulator and resource tracker module 114. In one implementation, one or more of the components can be consolidated into a single component, and/or a single component can be further divided into multiple components.

It should be noted that in some embodiments, the intelligent alarm manipulator and resource tracker module 114 is a component residing in the local proxy 175. In other embodiments, the module 114 can be an application that an end user can download and install on the mobile device 150. In some other embodiments, the module 114 may be a part of the OS 162. In some embodiments, the module 114 operates in a manner that is transparent to the applications (e.g., 202-206) that are being optimized.

In one embodiment, the intelligent alarm manager 115 can detect or intercept alarms/timers and determine associations or correlations between alarms/timers used by mobile applications to schedule tasks and corresponding use of resources by the alarms/timers when they fire off. The application alarm detector 216 can detect, intercept and/or track alarms/timers from multiple applications before or as they are set, or as they occur. Mobile applications can use alarms, timers or other trigger mechanisms to perform periodic or scheduled tasks. These tasks can use network, battery, CPU, memory and/or other resources. For example, an application may use a timer to poll a server according to a polling schedule to check for an update, which can activate (or power up) the wireless radio and use power (e.g., typically tens of seconds on a 3G connection). Thus, the task of polling a server can result in the utilization of network resources (e.g., use of radio), power/battery resource (e.g., turning the radio on and off consumes power), CPU resource, and memory resource, among others. Similarly, some applications can use alarms to wake up the mobile device 150 from a sleep mode to do a task. The waking up can consume battery/power resources.

The use of the network resources (e.g., radio use, use of network bandwidth), power/battery, CPU, memory, and the like by the alarms/timers across multiple applications can be tracked by the resource utilization tracker 116, in one embodiment. For example, the battery resource usage tracker 226 can track the battery/power usage when alarms from applications 204-206 are fired off. The network resource usage tracker 228 can track network usage (e.g., radio turned on, length of time radio remains on, amount of data per connection, etc.) of tasks triggered by the alarms from applications 204-206. The CPU resource usage tracker 230 can track, for example, the time taken to process the tasks or instructions triggered by the alarms from applications 204-206. The memory resource usage tracker 232 can track, for example, the memory used (e.g., 70% of the allocated memory) by the tasks or instructions triggered by the alarms from applications 204-206. The resource utilization tracker 116 can track the use of multiple resources across multiple applications, and provide the gathered and/or determined resource usage information to the intelligent alarm manager 115 improve resource usage efficiency.

In one embodiment, the alarm-resource association detector 220 can detect or determine associations or correlations, if any, between the alarms/timers from multiple applications and corresponding resource usage (e.g., battery, network, CPU, memory, etc.) as tracked by the resource utilization tracker 116. The application alarm detector 216 can detect alarms firing off at different times from multiple applications and the resource utilization tracker 116 can provide the resource utilization information tracked during the firing of the alarms. Using these information, the alarm-resource association detector 220 can determine one or more resources consumed by the triggering of which one or more alarms when they fire off.

For example, the alarm-resource association detector 220 can examine, analyze and/or process the tracked resource utilization information. If a spike in battery/power use, CPU use, memory use, or network activity matching the time and/or periodicity of the alarms/timers is detected from the examination, the alarm-resource association detector 220 can conclude that the alarms/timers are correlated or associated with the resource exhibiting the matching resource utilization pattern. These associations between the alarms of different applications and the resultant use of resources can be documented by the alarm resource association detector 220 and/or the resource usage reporting module 242.

In one embodiment, the alarm/timer manipulator 222 can analyze the associations between alarms/timers of multiple applications and resultant use of resources when they fire off, as determined by the alarm-resource association detector 222. Based on the analyzing, the alarm/timer manipulator 222 can intelligently make decisions and manipulate the alarms/timers across multiple applications such that the at least some of the alarms/timers of multiple applications are synchronized (e.g., occur at the same time). Such manipulation can help achieve savings in resource utilization. In one implementation, the intelligent decision making for manipulation of alarms/timers can have minimal or no adverse effect or impact on the applications using the alarms/timers. For example, if alarm 1 from application 202 uses a network resource every one minute, and alarm 2 from application 204 uses the same network resource every two minutes, based on the two associations, the alarm/timer manipulator 222 can manipulate alarms 1 and 2 to fire off at the same time every one and a half minutes (average of 1 minute and 2 minutes), or every two minutes (maximum of 1 minute and 2 minute), thereby optimizing the use of network resources.

In one implementation, the alarm manipulator 222 can manipulate timing of alarms/timers by delaying at least one alarm/timer or accelerating at least one alarm/timer to synchronize the alarms/timers. In another implementation, the alarm manipulator 222 can manipulate timing of alarms/timers by modifying initial values of the corresponding alarms/timers in the operating system.

In one implementation, the resource usage pattern detector 218 can detect or determine a pattern of firing off of alarms/timers. For example, some alarms/timers may be triggered during a certain period of time such as during night time, or when the backlight of the mobile device is off. For example, in the Android platform, some applications use alarms associated with wake locks (WakeLock) to bring the device out of sleep mode. When such a pattern is detected, the alarm/timer manipulator 222 can align multiple alarms/timers associated with wake locks to trigger at the same time or approximately the same time, such that all the scheduled tasks can be done without waking up the mobile device repeatedly. This aligning of multiple alarms/timers based on detected pattern can conserve battery power, improve CPU efficiency, and the like.

In one embodiment, the resource usage pattern detector 218 can determine, from the tracking, patterns in which the triggers fire off, and the patterns can be used by the alarm manipulator 222 in manipulating the timing of some of the triggers to prevent the triggers from firing off when user activity is not predicted or when the battery level is below a threshold. For example, based on user behavior, if use of an application is not anticipated for a period of time, the alarm manipulator can manipulate the timing of the alarm for that application to synchronize with other alarms that use the same resource(s) so that the resources of the mobile device can be optimized.

In one embodiment, the resource usage reporting module 242 can track savings in resource utilization from the manipulating of alarms, timers or other triggers. The resource usage reporting module 242 can generate on demand or periodic reports based on the tracked data. In one implementation, the tracked data can be displayed to the user via a reporting user interface. The report may be provided to a user of the mobile device and/or other entities or parties.

In one embodiment, the intelligent alarm manipulator and resource tracker module 114 includes a mode selector 236 that allows a user to turn on or off the optimization of resource usage via intelligent manipulation of the alarms/timers across multiple applications using a user interface provided by the user interface module 240. In one implementation, an application selector 238 can allow the user to explicitly select or deselect applications for resource usage optimization. In yet another implementation, the application selector can, based on determined associations between alarms/timers from multiple applications and resource usage, identify one or more applications that can be candidates for resource usage optimization.

In one embodiment, the intelligent alarm manipulator and resource tracker module 114 may be operational when the mobile device is on battery power (e.g., the mode selector can be configured to turn on the resource optimization by default when on battery power). When the mobile device is being charged to an electrical outlet, some of the components such as the resource tracker may be running. Alternately, the intelligent alarm manipulator and resource tracker module 114 may be operational regardless of whether the device is charging or on battery.

FIG. 3 depicts an example flow diagram illustrating a method 300 of intelligent alarm manipulator and resource tracker. As depicted, the method starts with intercepting of alarms/timers associated with mobile applications on a mobile device for performing various tasks at block 302. At block 304, usage of resources such as battery, network, CPU, memory, sensors (e.g., GPS receiver), vibration motor (e.g., vibration alert), and the like by the alarms/timers can be tracked.

In one implementation, at block 306, associations, relationships, correlations, or the like between the alarms/timers and use of resources can be determined. In another implementation, at block 312, associations between the alarms/timers, use of resources, and/or pattern use of resources can be determined. Based on the associations, alarms/timers can be manipulated (e.g., modified, delayed, accelerated, etc.) to cause the alarms/timers to fire off or be triggered all the same time at block 308. The manipulation may be achieved in many ways. For example, if three different alarms (from the same application or from different applications) use radio to connect to respective servers at time T, T+5 and T+15, the radio on time can be manipulated by setting the alarms to T+15. By way of another example, if two timers A1 and A2 are observed to use battery resource, and such use occurs during the night time, such information can be used to manipulate the timers so that both A1 and A2 go off at another time (e.g., the morning) instead of going off during the night time.

At block 310, the improvement or efficiency gained in resource usage from the manipulation of alarms/timers can be determined and/or tracked. The tracked data can be used for reporting to a user or other parties.

Figure 4:
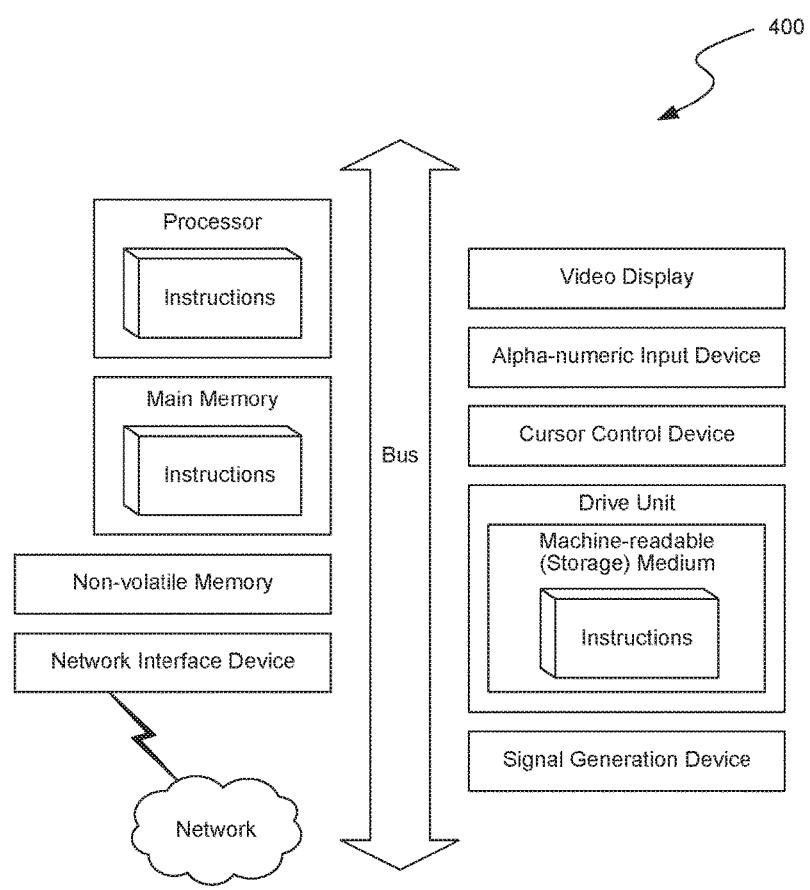
FIG. 4 shows a diagrammatic representation of a machine in the example form of a computer system within which a set of instructions, for causing the machine to perform any one or more of the methodologies discussed herein, may be executed.

FIG. 4 shows a diagrammatic representation of a machine in the example form of a computer system within which a set of instructions, for causing the machine to perform any one or more of the methodologies discussed herein, may be executed.

In the example of FIG. 4, the computer system 400 includes a processor, memory, non-volatile memory, and an interface device. Various common components (e.g., cache memory) are omitted for illustrative simplicity. The computer system 400 is intended to illustrate a hardware device on which any of the components depicted in the example of FIG. 2 (and any other components described in this specification) can be implemented. The computer system 400 can be of any applicable known or convenient type. The components of the computer system 400 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, 16, other aspects may likewise be embodied as a means-plus-function claim, or in other forms, such as being embodied in a computer-readable medium. (Any claims intended to be treated under 35 U.S.C. § 112, 16 will begin with the words "means for".) Accordingly, the applicant reserves the right to add additional claims after filing the application to pursue such additional claim forms for other aspects of the disclosure.

What is claimed is:

1. A method for managing resources on a mobile device, comprising:
   executing alarms set by multiple applications executing on the mobile device;
   altering behavior of the mobile device based on a detected activity status, wherein the detected activity status is based on screen status and sensed motion of the mobile device;
   wherein the altering behavior includes:
      delaying a timing of one or more alarms for the multiple applications,
         wherein the timing is delayed such that the one or more delayed alarms execute within a window of time, and
         wherein at least a subset of the one or more delayed alarms are associated with one or more wakelocks; and
   wherein the altering behavior is based on application settings, wherein the application settings enable the altering behavior in response to a user selecting the application for the altering behavior and disable the altering behavior in response to a user deselecting the application for the altering behavior.

2. The method of claim 1, wherein the altering behavior includes delaying acquisition of the wakelocks.

3. The method of claim 1, wherein the window of time is a transmission window for transmitting communications for the multiple applications.

4. The method of claim 1, wherein the altering behavior is further based on a charging status of the mobile device.

5. The method of claim 1, wherein the user remains inactive during the window of time.

6. The method of claim 1, wherein delaying a timing of one or more alarms comprising delaying a timing until a predetermined time.

7. The method of claim 1, further comprising tracking use of mobile device resources associated with the executed and delayed alarms.

8. The method of claim 1, further comprising ceasing the altering behavior when the screen of the mobile device turns on or motion of the mobile device is sensed.

9. The method of claim 1, wherein the altering behavior forms a power save mode that the mobile device enters into based on the screen status and sensed motion.

10. The method of claim 9, wherein the power save mode is exited when the screen of the mobile device turns on or motion is sensed.

11. A mobile device, comprising:
    a memory; and
    a processor, the mobile device configured for:
    executing alarms set by multiple applications executing on the mobile device;
    altering a behavior of the mobile device based on a detected activity status, wherein the detected activity status is based on a screen status and sensed motion of the mobile device;
    wherein the altering behavior includes:
    delaying a timing of one or more alarms for the multiple applications,
       wherein the timing is delayed such that the one or more delayed alarms execute within a window of time, and
       wherein at least a subset of the one or more delayed alarms are associated with one or more wakelocks;
    wherein the altering behavior is based on application settings, wherein the application settings enable the altering behavior in response to a user selecting the application for the altering behavior and disable the altering behavior in response to a user deselecting the application for the altering behavior.

12. The mobile device of claim 11, wherein the altering behavior includes delaying acquisition of the wakelocks.

13. The mobile device of claim 11, wherein the window of time is a transmission window for transmitting communications for the multiple applications.

14. The mobile device of claim 11, wherein the altering behavior is further based on a charging status of the mobile device.

15. The mobile device of claim 11, wherein the user remains inactive during the window of time.

16. The mobile device of claim 11, wherein delaying a timing of one or more alarms comprising delaying a timing until a predetermined time.

17. The mobile device of claim 11, wherein the processor is further configured for tracking use of mobile device resources associated with the executed and delayed alarms.

18. The mobile device of claim 11, wherein the processor is further configured for ceasing the altering behavior when the screen of the mobile device turns on or motion of the mobile device is sensed.

19. The mobile device of claim 11, wherein the altering behavior forms a power save mode that the mobile device enters into based on the screen status and sensed motion.

20. The mobile device of claim 19, wherein the power save mode is exited when the screen of the mobile device turns on or motion is sensed.

* * * * *